United States Patent [19]

Foldes

[11] 4,060,808
[45] Nov. 29, 1977

[54] ANTENNA SYSTEM WITH AUTOMATIC DEPOLARIZATION CORRECTION

[75] Inventor: Peter Foldes, Montreal, Canada

[73] Assignee: RCA Corporation, New York, N.Y.

[21] Appl. No.: 701,422

[22] Filed: June 30, 1976

[51] Int. Cl.$^2$ ............................................. H04B 7/00
[52] U.S. Cl. ........................... 343/100 PE; 333/21 A
[58] Field of Search ......................... 343/100 PE, 756; 333/21 A

[56] References Cited

U.S. PATENT DOCUMENTS

| 3,728,643 | 4/1973 | Chu | 333/21 A |
|---|---|---|---|
| 3,768,039 | 11/1976 | Ohm | 343/100 PE |
| 3,914,764 | 10/1975 | Ohm | 343/100 PE |

OTHER PUBLICATIONS

Vogt, An Analogue Polarization Follower for Measuring the Faraday Rotation of Satellite Signals, The Radio & Electronic Engineer, Oct. 1964.

Primary Examiner—Maynard R. Wilbur
Assistant Examiner—T. M. Blum

Attorney, Agent, or Firm—Leonard Weiss; Joseph D. Lazar; H. Christoffersen

[57] ABSTRACT

A spectrum reuse antenna system is described for transmitting orthogonally polarized RF waves at one frequency band to a satellite and for receiving orthogonally polarized RF waves from a satellite at a second frequency band through a common antenna. A local generator provides a first control signal which varies as a function of the typical rotation of the polarization of a transmitted wave at the one frequency band travelling through the ionosphere. The local generator also provides a second control signal which varies as a function of the typical rotation of the polarization of a received wave at the second frequency band travelling through the ionosphere. A driven means responsive to the first control signal causes a rotation of the polarization of the transmitted waves to correct for Faraday rotation in the ionosphere and a driven means responsive to the second control signal causes rotation of the polarization angle of the antenna system for the received waves to correct for the Faraday rotation.

12 Claims, 6 Drawing Figures

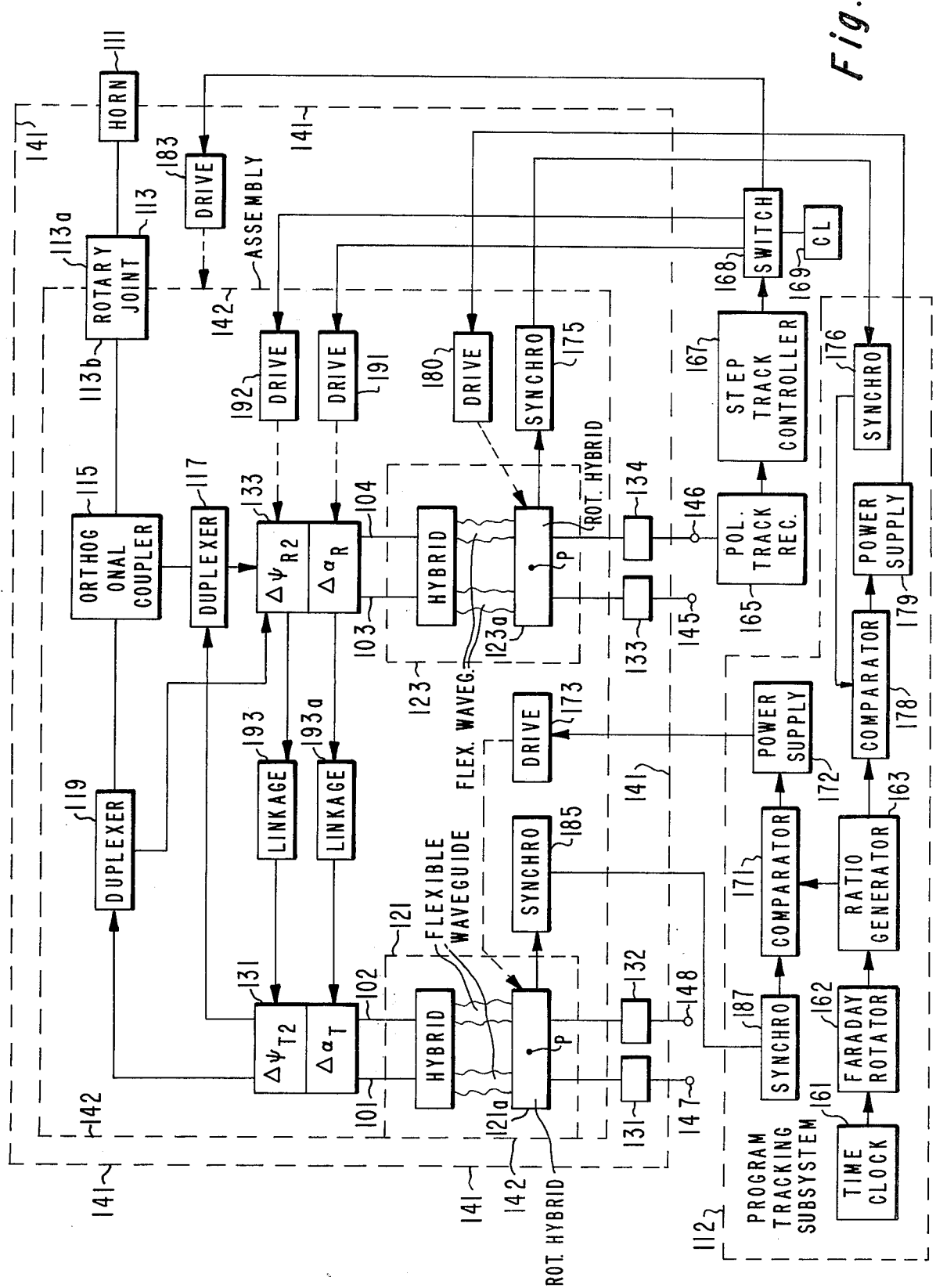

ANTENNA SYSTEM WITH AUTOMATIC DEPOLARIZATION CORRECTION

BACKGROUND OF THE INVENTION

This invention relates to antenna systems with means for automatically correcting for depolarization effects such as Faraday rotation, satellite caused rotation and rain.

The reuse of frequency spectrum based on two orthogonal polarizations is vitally dependent on the achievable isolation between these polarizations. If the orthogonality of the two polarizations (perpendicularity in the case of linear polarizations and perfectly left and right-hand circular polarizations in the case of circular polarization) is ideal at the transmit end and no cross-polarized component is generated by the media of propagation, then the available isolation at the receive antenna depends on the cross-polarized level (axial ratio) of the receive antenna and the perfectness of alignment of the polarization with the incoming wave.

In a two-way communication system, usually the same antenna at different frequencies is used for receive and transmit communications. Since the polarization attitude for these two frequencies are generally different, perfect polarization matching requires separate polarization alignment for the two frequencies. This, for instance, can be done by simultaneously minimizing the cross-polarized power levels at each receiving end of the above-described communications link.

In satellite communications, however, such a technique is not convenient, since polarization alignment is required not only at the earth station but also at the satellite. The complexity of the spaceborne equipment for such purpose can be avoided if the receive and the transmit polarizations are adjustable simultaneously at the earth station. When the propagation media is not affecting the polarization attitude of the up and down link waves, such alignment can be easily arranged. This can be done by locking the receive and transmit polarizations together at the earth station antenna in the same way as at the satellite antenna and then rotating these polarizations by physical or electrical means until ideal polarization alignment is achieved.

If the propagation media affects the polarization attitude of the up and down link waves differently, as it is in the practical case, for instance, due to direction and frequency dependent Faraday rotation through the ionosphere, the two polarizations have to be rotated independently for perfect alignment of the communication system. Such alignment is not possible by simple physical rotation (or equivalent) of the complete antenna and a radio frequency circuit is required which rotates the polarization separately for the up and down link. At the same time these links are at different frequency bands. The present invention provides a system in which the polarization attitudes may be independently and automatically rotated to correct for polarization changes due to Faraday rotation and/or due to rain while maintaining a very high degree of polarization purity and isolation as the rotation of the polarization takes place.

BRIEF DESCRIPTION OF INVENTION

Briefly, an antenna system is described which provides maximum coupling of radio frequency waves of a given original polarization via a coupler despite rotation of the polarization of the waves when travelling through the ionosphere. The system includes a local generator which provides a continuous control signal which represents the nominal amount of Faraday rotation that then exists for a radio frequency wave at the operating frequency of the antenna system in the region of the antenna site. The antenna system further includes means responsive to the control signal for adjusting the polarization angle of the coupler to maintain alignment.

DESCRIPTION OF DRAWINGS

A more detailed description follows in conjunction with the following drawings wherein:

FIG. 6 is a block diagram of a spectrum reuse antenna feed system with automatic correction for Faraday caused rotation, satellite caused rotation and rain caused rotation in accordance with a second preferred embodiment of the present invention.

DETAILED DESCRIPTION

Figure 1:
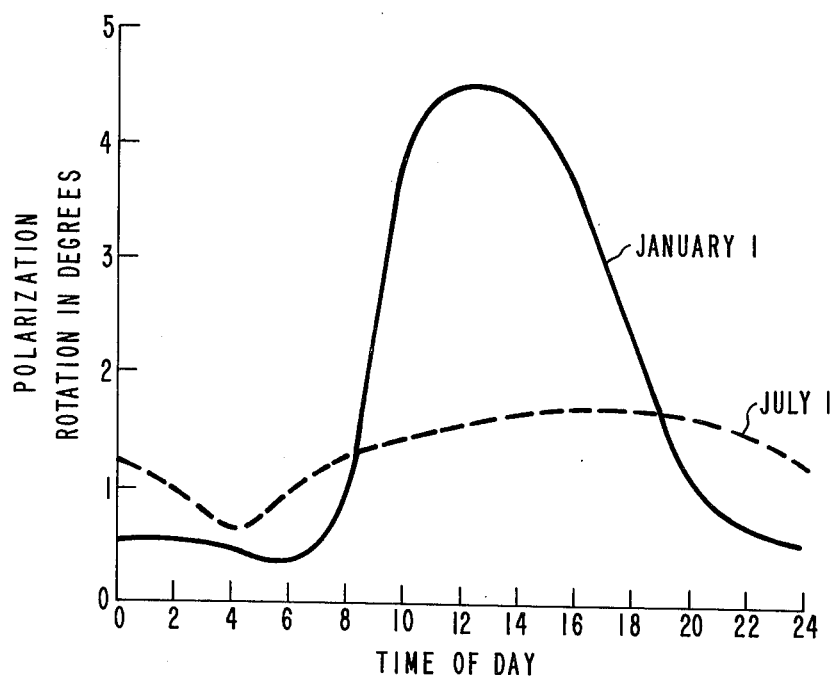
FIG. 1 is a plot of typical daily variation of Faraday rotation.

Before describing the particular apparatus of this invention for automatically correcting Faraday rotation and rain caused depolarization a brief description follows about these effects. The Faraday effect is related to the rotation of the polarization of a wave as it travels through the ionosphere in the presence of the earth's magnetic field. Referring to FIG. 1, the typical measured daily variations of this rotation is shown for a typical North American site at 3.7 GHz during two selected days in a year of maximum sunspot activity. The rotation has a one day, one year and 11 year periodicity related to the variations of the ionosphere during the 11-year base period of the sunspot activity. The daily variation is approximately sinusoidal with a maximum before sunset, and the yearly variation is also approximately sinusoidal with a maximum in January. The value of the Faraday rotation at a given time instant is inversely proportional to the square of the frequency. Finally, the sign of Faraday rotation is opposite for the up and down link. Relatively large amounts of empirical statistical data is available on which basis a significant part of the Faraday rotation can be predicted in advance.

The second effect is related to the rotation of polarization caused by rain. This rotation at a given frequency is a function of the average density of rain along the path of propagation, drop size and angle between polarization and cant angle of the rain drop. If the raindrop diameter is small compared to the frequency and the frequency band used for communication is not very wide, then the frequency dependency of the rain caused polarization rotation can be neglected. Since the fine structure of rain distribution cannot be predicted in advance, the polarization rotation characteristics of the rain must be measured for each earth station before an improvement in the associated polarization isolation can be implemented.

Figure 2:
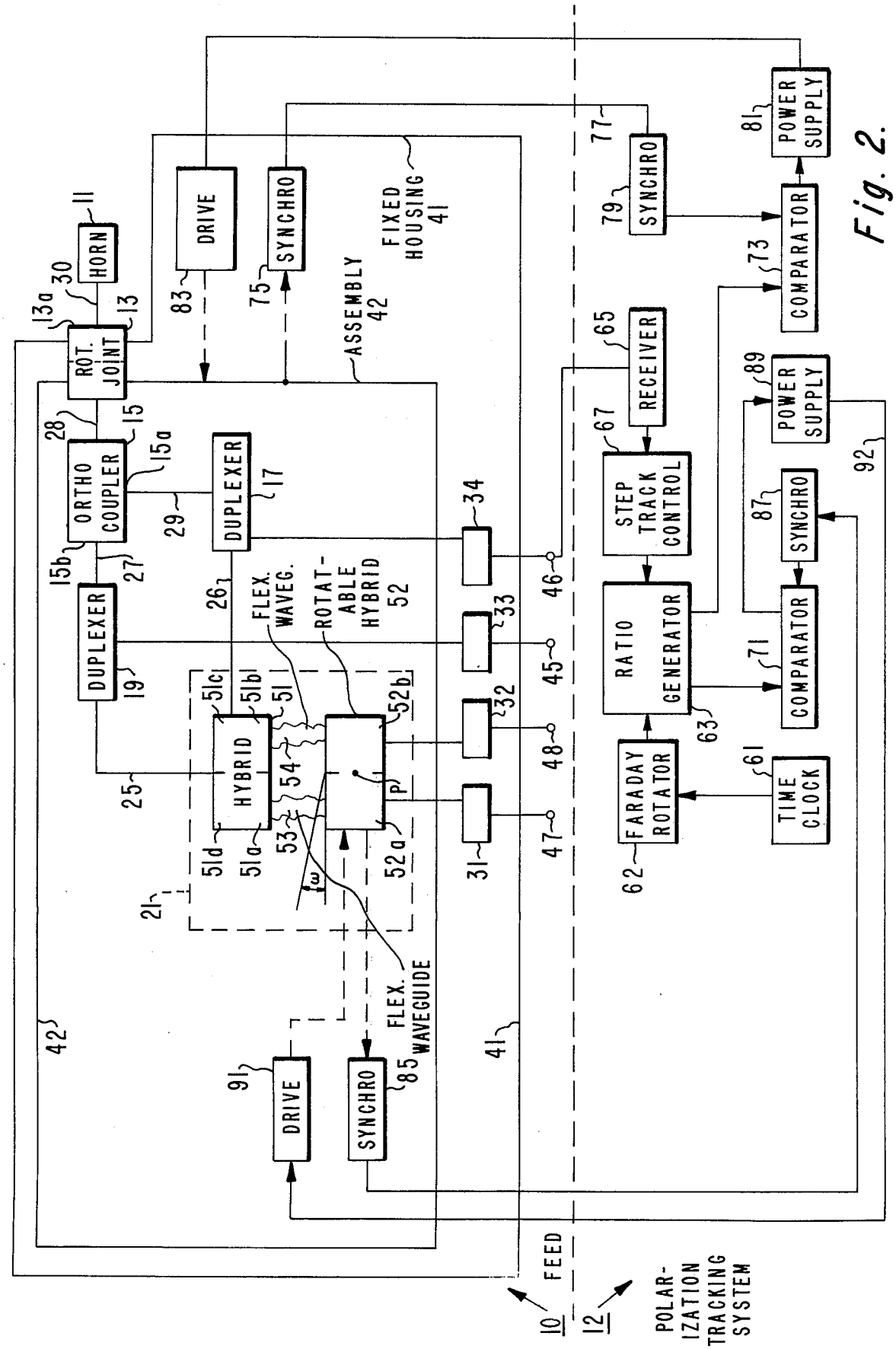
FIG. 2 is a block diagram of a spectrum reuse antenna system with automatic correction for Faraday and satellite caused polarization rotations in accordance with a first preferred embodiment.

FIG. 2 illustrates a block diagram of an automatic correction system when rain effects are neglected. The system consists of two major subsystems the microwave circuit or feed system 10 capable of spectrum reuse operation and the polarization tracking system 12. The feed system 10 comprises the horn 11, a rotary joint 13, orthogonal coupler 15, two duplexers 17 and 19, an adjustable power divider assembly 21, connecting waveguides 25 thru 30, and flexible waveguides 31 thru 34. The portion of the feed system 10, with the exception of the flexible waveguides 31 thru 34, the horn 11 and the horn side 13a of the rotary joint 13, is referred to as assembly 42, and is rotatable inside a fixed housing cylinder 41. The two receive terminals 45 and 46 and two transmit terminals 47 and 48 of the feed are fixed and attached to the fixed housing cylinder 41. The flexible waveguides 31 thru 34 allow for restricted relative movement between assembly 42 and housing 41. In the receive band, the incoming signals received by the horn 11, travel through the rotary joint 13, orthogonal coupler 15 and receive bandpass filter of the duplexers 17 and 19 towards the two receiver terminals 45 and 46. The polarization alignment is achieved by the rotation of the orthogonal coupler 15 relative to the horn 11 which coupler 15 in turn is rotated by rotation of the entire microwave circuit built into the polarization rotating assembly 42.

The two transmitter frequency band signals from sources 47 and 48, travel through the adjustable power divider assembly 21 (mounted to rotatable assembly 42), the duplexers 17 and 19, and the horn 11 via the orthogonal coupler 15 and rotary joint 13. When the assembly 42 is rotated, then the polarization attitude in the transmitter frequency band is moved by the same amount as for the receive band. The orthogonal coupler may be like that described in connection with FIG. 8 of U.S. Pat. No. 3,569,870.

The adjustable power divider assembly 21 comprises two short-slot hybrids 51 and 52 separated by two flexible waveguides 53 and 54. When the length of the two flexible waveguides 53 and 54 separating the hybrid 51 and hybrid 52 are equal, the transmit and receive band polarizations not only move together with the orthogonal coupler but they are also aligned parallel and orthogonal to each other. When the length of the two flexible waveguides 53 and 54 in the assembly 21 differ, which can be achieved by rotating the hybrid 52 around the pivot point P, then the power division is adjusted and the output polarization corresponding to the two transmitter sources at terminals 47 and 48 remain orthogonal to each other, but they are rotated relative to the main planes of the output terminal of the orthogonal coupler 15. The orthogonal coupler 15 is responsive to the relative power at the two orthogonal ports to provide a signal polarized in proportion to the vector addition of the relative power. The transmitter terminals 47 and 48 are coupled via flexible waveguides 31 and 32 to ports 52a and 52b of hybrid 52. These signals are power divided and coupled to waveguides 53 and 54. With hybrid 52 oriented so that waveguides 53 and 54 are of equal length, the signal from transmitter at terminal 47, coupled to port 52a is equally power divided with one-half the signal coupled to waveguide 54 90° out of phase with the transmitted signal coupled to waveguide 53. The transmitted signal coupled to port 51a via waveguide 53 is equally divided with half power to port 51d and half power to port 51c. This transmitted signal from port 51a to port 51c undergoes an additional 90° phase shift. The transmitted signal at port 51b is equally power divided with the onehalf of the 90° relative phase signal coupled to port 51d undergoing an extra 90° phase shift to provide a destructive interference at port 51d and all of the transmitted signal from the source at terminal 47 is coupled via port 51c and duplexer 17 to port 15a of orthogonal coupler 15. The transmitted signal from terminal 47 is therefore totally coupled to the same terminal 15a as the receiver at terminal 46 and therefore these polarizations are aligned and rotate together when assembly 42 is rotated. Similarly, all of the transmitted signal from terminal 48 is coupled via port 51d, duplexer 19 to terminal 15b of orthogonal coupler 15. Likewise, all of this transmitted signal is radiated in polarization alignment with signals coupled to the receiver 45 via duplexer 19.

When rotating hybrid 52 around the pivot point P so as to shorten one waveguide length while elongating the other, the electrical length between the two paths (waveguides 53 and 54) is changed causing an adjustment of the percentage of power of transmit signals to the input terminals of the orthogonal coupler causing consequently polarization adjustment. Since the alteration in the two path lengths affects both transmitter signals equally, the effect is to cause the two transmit signals to be rotated relative to the receive signals but to remain orthogonal to each other. This alteration in the two path lengths can then be used to correct for Faraday rotation while maintaining orthogonality between the two transmit and two received signals.

For a typical application, when the transmit band is 5925 – 6425 MHz, the flexible waveguide is type WR-159 and its length is 4.5 inches, the rotation, ω, of the hybrid 52 causes $$\tau_T \approx 2.44 \, \omega$$

rotation of the polarization vector at the output terminal of the orthogonal coupler. When $\omega = \pm 4.098°$, then $\tau_T = \pm 10°$ in the middle of the above frequency band. When the polarization isolation at mid-band is 45 db for $\tau_T = 0$, then typically 38 db is achievable for $\tau_T = \pm 10°$ at the limits of the frequency band. The polarization rotation in the 6 GHz transmit frequency band, for example, can be used to set the 6 GHz band polarization independent of the angular position of the orthogonal coupler and thus independent of receiver frequency band μ polarization. The receive band may be about 4 GHz. The typical conditions can be illustrated in a numerical example. Assume that the required polarization rotation due to Faraday effect at receiver frequency $f_1 = 3950$ MHz is $\tau_R = 4°$ and at transmitter frequency $f_2 = 6175$ MHz is $$\tau'_T = \left(\frac{f_1}{f_2}\right)^2 \tau_R = \frac{\tau_R}{2.4439} = 1.637°$$

If the receiver band polarization alignment is achieved by a $\tau_R$ rotation of the orthogonal coupler in the clockwise direction then the transmitter band polarization has to be rotated by $$\tau_T = \tau'_T + \tau_R = \left[1 + \left(\frac{f_1}{f_2}\right)^2\right]\tau_R$$

in the counter-clockwise direction. The necessary rotation of the hybrid 52 is $$\omega = \frac{\tau_T}{2.44} = .4098\left[1 + \left(\frac{f_1}{f_2}\right)^2\right]\tau_R$$

yielding 2.31° for the above example. The adjustable power divider assembly 21 may also be like that described in Reissue Pat. No. 28,546, dated Sept. 2, 1975. The flexible waveguides being replaced by hybrids 17 and 19 and adjustable plunger system 23.

The polarization tracking system 12 as illustrated in FIG. 2 can operate under program tracking or auto tracking. Under program tracking an input of the local time is provided from time clock 61. The output from clock 61 controls Faraday rotator 62 which produces an output Faraday rotation control signal which characterizes the statistically predicted (nominal) Faraday rotation for a given site at a given frequency. Assuming that the given frequency is selected as the center of the receive frequency band and the site is within the geographical area to be served by the satellite communication system, the Faraday rotation can be tabulated as a function of time based on past statistical measurements. This function can be expressed as a Fourier series. Then the statistically determined function can be replaced by as many terms of the Fourier series as necessary for a given accuracy of approximation. For most practical purposes, it is adequate to retain one harmonic corresponding to the daily variations and one harmonic corresponding to the yearly variations of the Faraday effect. If better accuracy during a 24-hour period is desirable, a further harmonic corresponding to an ∼ 8 hour periodicity may be included. If the once-a-year adjustment over the sunspot cycle period is not desirable, then an 11 year period harmonic may be added. This Faraday rotation signal is then coupled to a ratio generator 63 to produce two control signals - one for the uplink and one for the downlink. Details of a Faraday rotator which contain two harmonics only and a ratio generator will be described in later paragraphs.

In addition to the programmed Faraday rotation information an auto-tracking signal from a receiver 65 and step track controller and motor 67 may be applied to the ratio generator 63. This auto-tracking is used in a system where the satellite transmits the beacon signal with a polarization corresponding to that to be received by receiver terminal 45. This signal is then not detectable at the receiver terminal 46 when the position of the orthogonal coupler perfectly matches the incoming polarization. Assuming that the Faraday rotation has been compensated and the satellite is in its ideal orientation position, no signal will be detectable at the receiver terminal 46 (the present discussion neglects rain effects). When the satellite orientation differs from its nominal, then the polarization of the incoming signal is rotated causing an error signal at the output terminal 46. This signal can be received by receiver 65 detected and amplified and its output delivered to a polarization angle step track controller 67. This controller 67 integrates and stores the average signal and sends a level signal to ratio generator 63.

The output of ratio generator 63 is coupled to comparators 71 and 73. The position of the orthogonal coupler 15 is monitored by syncro 75. Syncro 75 provides a signal via lead 77 and receiver syncro 79 to comparator 73. If the orthogonal coupler 15 is in the correct position for alignment with the signal as per the Faraday rotator program information states that it should be, no output signal is provided to power supply 81. If, however, there is a positive or negative difference signal, power is applied via power supply 81 to drive motor 83. This causes rotation via rotary joint 13 of the orthogonal coupler 15 and assembly 42 relative to horn 11 into the programmed alignment. Positive or negative comparative voltage causes one or the other of the relays in the power supply 81 to be energized which provides the appropriate direction of the drive motor 83 to produce alignment.

The rotated position of hybrid 52 of adjustable power divider assembly 21 is detected by syncros 85 and 87 and a signal representing this position is compared at comparator 71 to the programmed Faraday rotation position from ratio generator 63. The difference signal controls power supply 89 which is coupled to drive motor 91 via lead 92 which causes rotation of the hybrid 52 about point P. The direction in which the hybrid 52 is rotated is controlled via the positive or negative signal out of comparator 71. As mentioned previously, the rotation of hybrid 52 changes the path length of waveguides 53 and 54. The drive motor could also change the position of the slidable plungers in the embodiment of referenced U.S. Pat. No. Re 28,546.

The Faraday rotator 62 containing the daily and yearly harmonics can be achieved by a mechanical structure. The daily and yearly harmonics are related by $\psi_1/\psi_2 = 365.25$, which can be approximated by the simple 10-wheel gear train illustrated by sketch in FIG. 3, resulting in $$\frac{\psi_1}{\psi_2} = \frac{6 \times 19 \times 4 \times 4}{5} = 364.8$$

or $\pm 6.167 \times 10^{-4}$ accuracy over a 1 year period, well within the accuracy requirement for the present purpose. The concentric gears (sharing the same axis) are locked to each other on the same shaft.

Figure 3:
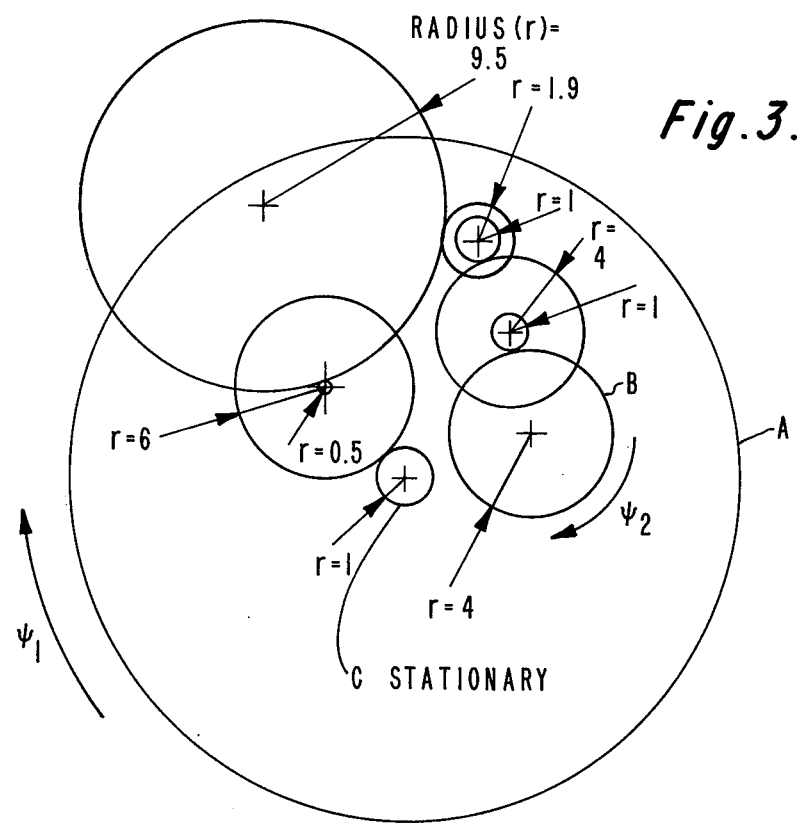
FIG. 3 is a functional sketch of the gear train for generating daily and yearly periodicity in the antenna polarization corresponding to Faraday rotation caused by the ionosphere.

It can be seen from FIG. 3 that if wheel C is stationary and all the other wheels are mounted on wheel A, then a rotation of wheel A by the angle $\psi_1$ causes a rotation of wheel B by $\psi_2$, where $\psi_1/\psi_2 = 364.8$. The radii shown in FIG. 3 represent relative dimensions.

Figure 4:
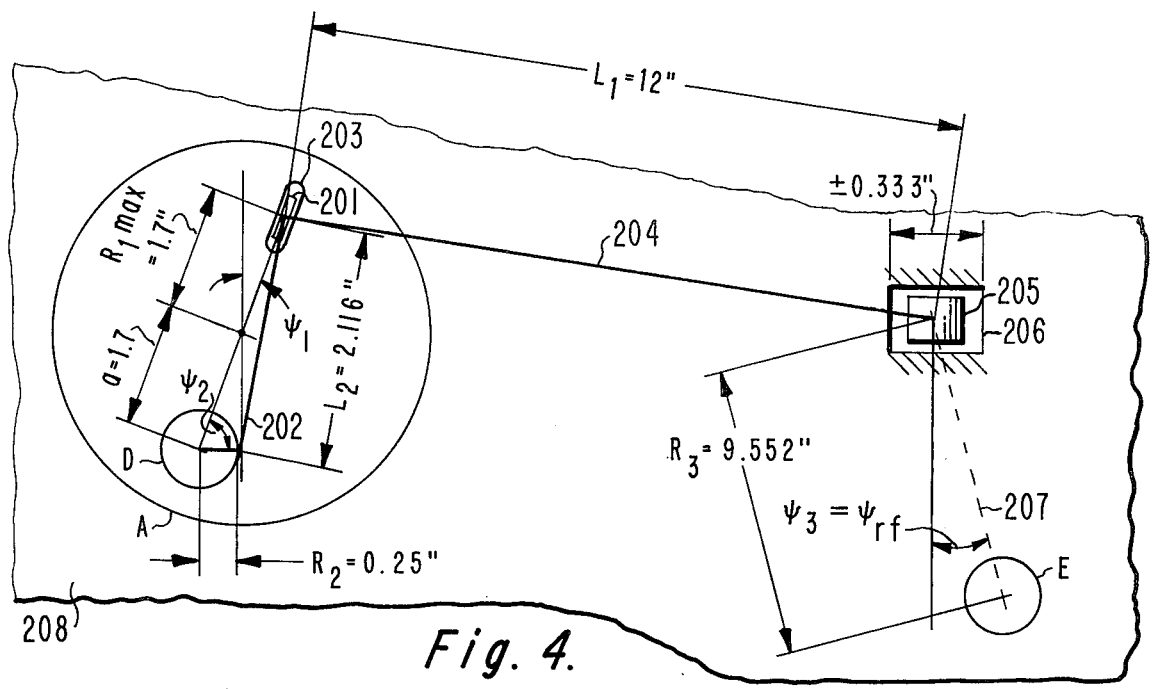
FIG. 4 is a conceptual drawing of the mechanism for generating polarization angle rotation (Faraday rotator).

FIG. 4 illustrates the concept of the Faraday rotator. FIG. 4 shows the other side of wheel A where a wheel D, mechanically locked to wheel B is also mounted at a distance of 1.7 inches from the center of wheel A. Assume that wheel A is rotated daily around using the information provided by the time clock 61, thus $\omega_1 = 360°$ per day. During this time, wheel D rotates with $\omega_2 = (1/364.8) = 0.98684°$ per day. Wheel D has a radius of $R_2 = 0.25$ inches and has a bar 202 coupled to its periphery which moves a slide element 201 fixed to the end of bar 202. The bar 202 has a length $L_2 = 2.116$ inches. The slide element 201 is slidably mounted in slot 203 of wheel A. The center of wheel D is a distance a = 1.7 inches from the center of wheel A. A 12-inch long bar 204 is coupled at one end to slide element 201 and at the opposite end to a second slide element 205 in slot 206 of a body 208. A mechanical coupling (9.552 inch telescoping bar) 207 is coupled between slidable element 205 and output shaft E. The position of element 201 in slot 203 defines a distance $R_1$ ($R_1$ max = 1.7 inch) from the center of wheel A, thus together with $\psi_1$ defines the position of slide element 205 in slot 206. In turn, for a given $R_3$ mounting distance for shaft E, the position of element 205 defines the angular position $\psi_3$ of the output shaft E. For the conditions when $$a \leq R_1 Max, L_2 >> R_2, L_1 >> R_1 Max$$

the following approximate equations can be written for the geometry shown in FIG. 4.

$$R_1 + a \approx L_2 + R_2 \cos \psi_2$$

$$R_1 \approx (L_2 - a) \left(1 + \frac{R_2}{L_2 - a} \cos \psi_2 \right) =$$

$$m_1 (1 + m_2 \cos \psi_2)$$

$$x \approx R_1 \cos \psi_1 + L_1$$

$$R_3 \psi_3 = x - L_1 = R_1 \cos \psi_1 = m_1 \cos \psi_1 (1 + m_2 \cos \psi_2)$$

or $$\psi_3 = \frac{L_2 - a}{R_3} \cos \omega_1 t \left(1 + \frac{R_2}{L_2 - a} \cos \omega_2 t \right)$$

where
$\psi_1/t = \omega_1 = 360°/\text{day}$ and $\psi_2/t = \omega_2 = 360°/\text{year}$.
It can be seen that the above mechanism produces the required daily cosine variation for $\psi_3$ with a yearly period of amplitude modulation. If at January 1, noon, $\psi_1 = \psi_2 = 0$, $\psi_3 = 4°$ and at July 1, noon, $\psi_1 = 0$, $\psi_2 = 180°$, $\psi_3 = 1°$ then on the basis of the above formulas the following geometrical characteristics can be calculated

| | |
|---|---|
| $R_2$ | = .25 in. |
| a | = 1.7 in. |
| $R_1$ Max | = 1.7 in. |
| $L_2$ | = 2.117 in. >> .25 in. |
| $L_1$ | = 12 in. >> 1.7 in. |
| $R_3$ | = 9.552 in. |
| ½ $R_{3\psi 3Max}$ | = .333 in. |

Figure 5:
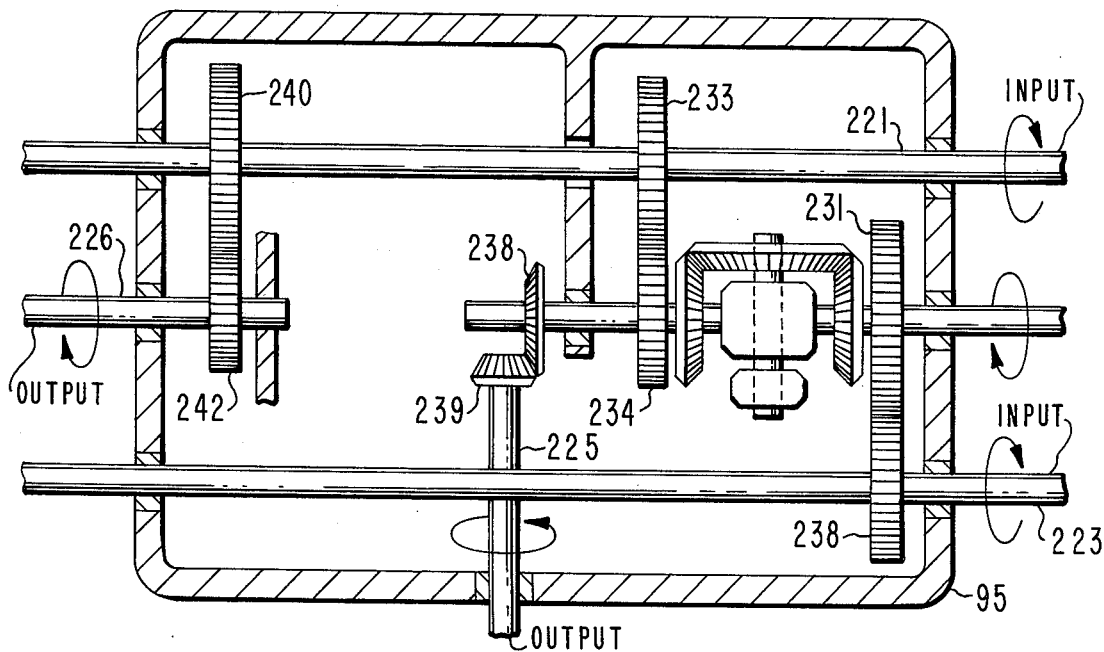
FIG. 5 is a sketch of the ratio generator in FIG. 2.

The output angle $\psi_3$ of the Faraday rotator is coupled to the input shaft 221 of the ratio combiner 63 represented by gear box 95 in FIG. 5. The ratio combiner 63 is a gear box with two input shafts 221 and 223 and two output shafts 225 and 226, for example. The position of $\psi_{rf}$ of the input shaft 221 represents the Faraday rotation in the received frequency band and therefore it is identical to $\psi_3$. The position $\psi_{rs}$ of the input shaft 223 represents the rotated position from step track controller 67. As stated previously in an auto tracking system, a detected beacon signal which represents the level of the cross-polarizated signal received at receiver 65 is coupled to the step track controller 67. The controller 67 stores the average signal level and rotates the output motor, averages the new signal level and compares it with the level before rotation. If the level decreases, the motor is rotated in the same direction, if the level increases, the motor is rotated in the opposite direction. The output shaft position of this motor in the step track control therefore represents the polarization angle errors caused by satellite or propagation media introduced rotations. The shaft of this motor in the controller 67 is connected to the shaft 223 of the ratio generator 63. The ratio generator 63 has two output shafts, (225 representing the first control signal) for the control of the receiver band polarization and 226 (representing the second control signal) for the control of the transmitter band polarization. For a particular ratio generator 63, the gears numbered in FIG. 5 had the dimensions of Table 1.

TABLE 1

| # | Teeth | Pitch | Diameter |
|---|---|---|---|
| 231 | 72 | 48 | 1.5 |
| 232 | 72 | 48 | 1.5 |
| 233 | 72 | 48 | 1.5 |
| 234 | 72 | 48 | 1.5 |
| 235* | | | .781 |
| 236* | | | .781 |
| 237* | | | .781 |
| 238 | 60 | 48 | 1.250 |
| 239 | 30 | 48 | 0.625 |
| 240 | 90 | 48 | 1.875 |
| 242 | 64 | 48 | 1.333 |

*Differential gear box-independent of number of teeth and pitch in gear box

The position of shaft 225 is equal to $\psi_{rf} + \psi_{rs}$ where $\psi_{rs}$ is equal to the shaft position of shaft 223. If, therefore, receiver 65 detects no cross-polarized signal or the auto-tracking mode is not used, the position of shaft 225 is equal to the position of shaft 221. As discussed previously, with a selected position of the receive band polarization, a related polarization offset is required for the transmit band. The required polarization ratio for the discussed arrangement is $$K_f = \frac{-\tau_R + \tau_T'}{R} = \frac{-4° + 1.6°}{4°} = -1.4096.$$

The output shaft 226 position of the ratio generator is equal to $K_f \times \psi_{rf}$. The output shafts 225 and 226 provide controlled position angles. The position of shaft 225 represents the added rotation caused by Faraday and satellite controlled rotations. The position of shaft 226 takes into consideration the position of the Faraday rotator 62 and provides the appropriate Faraday rotation relative to the received frequency band. Note that the constant $K_f$ is negative to correct for the direction in which the rotation correction takes place. Also, note that the satellite attitude variation caused polarization rotation for the transmitter band is the same as for the receive frequency band and is automatically taken care by the $\psi_{rs}$ correction of the orthogonal coupler position.

It may be noted that in a typical satellite communication system, the satellite attitude error is unpredictable during station-keeping operations only. Specifically, for synchronous satellites, once a station-keeping operation has been completed, the polarization attitude of the satellite as a function of time is predictable until the next station-keeping operation. In this case, the variation of error will have a one day periodicity and the output angle from the step track controller can be recorded as a function of time over a one day period. Since the previously described Faraday rotator has a built-in one day periodic component in its angle output, the satellite caused polarization angle error can be combined with the Faraday rotation of the polarization angle by simply re-adjusting the magnitude and phase of the daily variation of the polarization angle. This can be done (see FIG. 4) by changing the length of the control arm 202 and changing the initial position of wheel A. From this it follows that if the perturbations during the short periods of station-keeping operations are tolerable, then the tracking receiver and step track controller can be provided by only a master earth station of the overall communications network.

The operations of the remaining earth stations of the network can be based on the satellite polarization attitude error data obtained by the master station. This error can be partly or completely eliminated by adjusting the mechanical constants of the Faraday rotator unit.

It may be noted that although more time-consuming and less accurate, the Faraday rotators in different earth station locations can be also empirically optimized for maximum polarization isolation by adjusting arm 202 and the initial phase of wheel A without any outside data, if the capability to monitor the polarization isolation or the polarization error caused system noise degradation is available.

When an electromagnetic wave with a general polarization attitude travels through the atmosphere, the status of its polarization changes if either the attenuation or the phase shift is different for the vertical and horizontal polarization components of this wave. Generally for clear weather this differential attenuation or phase shift is small, thus, polarization rotation is negligible or small. However, during heavy rain, the non-spherical shape of the rain drop causes both a differential attenuation and phase shift with associated polarization rotation and axial ratio deterioration. The primary effect of rain is associated with the diffferential phase shift between a field component which is parallel to the major axis of the rain drop and the field component which is perpendicular to the major axis. Compared to this effect, the differential attenuation between these field components is small and can be neglected for most applications. The differential phase shift does not deteriorate the polarization isolation if the actual polarization in a communications channel can be aligned parallel or perpendicular to the major axis of the rain drop. Unfortunately, this cannot be done generally since the inclination of the rain drop and the average inclination of rain drops over the propagation path varies randomly with time, while the required polarization attitude determined by the spacecraft and condition of the ionosphere is relatively constant and not controllable for a given earth station. Consequently, the rain effect can be compensated only if the required polarization vector is decomposed into two components in an orthogonal coordinate system where one coordinate axis is parallel to the major axis of the rain drop. If, under such conditions, a proper differential phase shift is introduced between the two components opposite to the one caused by the rain then the effect of the rain is compensated. A similar technique can be applied to the differential attenuation although this may be required only for very high polarization isolations.

Referring to FIG. 6, a block diagram of such system is presented. It can be seen that the basic microwave circuit of the feed is very similar to that shown in FIG. 2. The system includes a horn 111, a rotary joint 113 and orthogonal coupler 115, duplexers 117 and 119, and transmit adjustable power divider assembly 121. In addition, an adjustable power divider assembly 123 is located in the receive chain. The receive adjustable power divider assembly 123 operates similarly to the transmit adjustable power divider assembly 21 described in connection with FIG. 2. In addition, between the transmitter adjustable power divider assembly 121 and duplexers 117 and 119, is located a rain control assembly 131. Similarly, between the receive adjustable power divider assembly 123 and duplexers 117 and 119 is located a second rain control assembly 133. The rain control assembly 131 and 133 is a differential phase shifter-differential attenuator unit capable of producing differential phase shifts and differential attenuations. The differential values are between 101 and 102 paths in the transmitter chain and the 103 and 104 paths in the receiver chain. To provide differential phase shift, the rain control assemblies 131 and 132 may be constructed like that of the adjustable power divider assembly 21 in FIG. 2. The two inputs of transmit adjustable power divider assembly 121 are coupled through flexible waveguides 131 and 132 to terminals 147 and 148 respectively. Similarly, the outputs from the receive adjustable power divider assembly 123 and coupled via flexible waveguides 133 and 134 to receive terminals 145 and 146. The feed system described above with the exception of the flexible waveguides, the horn 111 and the horn side 113a of the rotary joint are referred to as a polarization rotator assembly 142 and is rotatable inside a fixed housing cylinder 141. The two receive terminals 145 and 146 and the two transmit terminals 147 and 148 are attached to the housing cylinder 141. The flexible waveguides 131 and 134 allow for respective relative movement between assembly 142 and housing 141. In the receive band, the incoming signals received by the horn 111 travel through the rotary joint 113, orthogonal coupler 115 and receive band pass filter of duplexers 117 and 119. The receive signals pass through rain control assembly 133 and receive adjustable power divider hybrid assembly 123 to terminals 145 and 146. The two transmitter frequency band signals from sources 147 and 148 travel through the adjustable power divider assembly 121, the rain control assembly 131, the duplexers 117 and 119, the orthogonal coupler 115, the rotary joint 113, to the horn 111.

As in the previous system described in connection with FIG. 2, a program tracking subsystem 112 is provided including a time clock 161 and a Faraday rotator 162. The time clock 161 and the Faraday rotator 162 may be similar to that described previously in connection with FIG. 2. The output from the Faraday rotator 162 is coupled to a ratio generator 163. It may be noted that the required ratio of differential phase shift provided in assembly 123 and the differential phase shift in assembly 121 ($\Delta\phi_{R1}/\Delta\phi_{T1}$) from ratio generator 163 is $$\frac{\Delta\phi_{R1}}{\Delta\phi_{T1}} \approx \left(\frac{f_T}{f_R}\right)^2$$

where $F_T$ is the transmitter frequency and $f_R$ is the receiver frequency. A signal representing the rotated position of the hybrid 121a in the transmit adjustable power divider assembly 121 is provided via syncro 185 and 187 to comparator 171. A difference signal between the position of the hybrid 121a in assembly 121, and the programmed position as determined by the Faraday rotator 162 and ratio generator 163 provides a control signal to power supply 172 causing the drive motor 173 to properly position the rotatable hybrid 121a in adjustable power divider assembly 121. Similarly, the rotated position of hybrid 123a in receive adjustable power divider assembly 123 is detected by syncros 175 and 176. The rotated position of the hybrid 123a in assembly 123 is compared with the programmed Faraday rotator position from ratio generator 163 at comparator 178. The error signal detected at comparator 178 causes power supply 179 to be energized in the proper polarity to cause drive motor 180 to move the rotatable hybrid 123a in assembly 123 into the proper position to provide for the appropriate differential phase shift to correct for Faraday rotation.

At the receive terminal 146, is coupled a polarization tracking receiver 165. As discussed previously, this receiver is used in a system wherein a beacon signal is being transmitted from the satellite, where the beacon signal polarization is aligned with the polarization of receiver 145. The receiver 165 detects the cross-polarized signal which causes via step track controller 167 and switch 168 the drive 183 to rotate the whole assembly 142 relative to horn 111 to minimize the cross polarization. As mentioned previously, this receiver 165 can be used to correct for satellite rotation. In addition, by the system described in FIG. 6, rain-caused polarization rotations are corrected by the rain control assembly 131 and rain control assembly 133 via drive motors 191 and 192. The cross-polarized signal detected at the receiver 165 is coupled to step track controller 167. The controller has for example three integrators which average and store sequentially three signals, one is used to control the differential attenuator drive 191, the second to control the orthogonal position drive 183 and the third to control the differential phase shifter drive 192. The switch 168 is switched by a clock 169 to alternately provide step track control signals to drives 183, 191 and 192. When a cross-polarized signal is detected and drive motor 192 is activated, the horizontal and vertical components of the received waves are adjusted (adjusting differential phase) in a direction to reduce the cross-polarized signal. The drive motor 192 is coupled via linkage 193 to provide equal and opposite amounts of differential phase change in rain control assembly 131 than the phase change caused by the rain.

Assume that at the beginning, the nominal position of the satellite attitude is characterized by the angle, $\psi$ and the effects of the ionosphere and rain are neglible. Under these conditions, the polarization rotator assembly 142 shown in FIG. 6 must be set to its nominal position by drive 183. For example, this nominal position may be with the main planes of the orthocoupler output terminal arranged horizontal and vertical (for a vertically horizontally polarized satellite and earth station in the plane containing the satellite and the axis of the earth). The polarization angle of the feed corresponding to $\psi$ is set by adjusting power divider assemblies 121 and 123 using the method (change in length of the two paths) described between the two hybrids in connection with FIG. 2.

When the effects of the ionosphere become noticeable, the $\Delta\phi_{T1}$ and $\Delta\phi_{R1}$ values in the rotatable hybrid assemblies 121 and 123 are re-adjusted (the two path lengths between the hybrids are changed) according to the data available from the program tracking subsystem. This program tracking subsystem includes the time clock 161, the Faraday rotator 162, the Rx/Tx polarization angle ratio generator 163 and two conventional servo drives 173 and 180 in this subsystem.

When the satellite polarization angle varies in a random manner, then a tracking receiver and step track controller have to be used also. If, under these conditions, the satellite determined polarization attitude rotates into a new position, an error signal is detected at receiver 165 and controller 167 and power is fed to drive 183 via switch 168. This, in turn, corrects the position of the polarization rotator assembly by simultaneously aligning the transmit and receive band polarizations. The switch 168 for this operation does not have to be active and may nominally pass the output signal from the step track controller to drive 183. It may be noted that during this operation the program tracked Faraday rotation remains unaffected and works as before.

When the effects in the atmosphere become noticeable, the switch 168 at the output of the step track controller 167 is activated. This switch connects the step track controller 167 either to the polarization rotator assembly orthocoupler drive 183, the receiver band differential phase shifter drive 192 or differential attenuator drive 191 to be discussed later. Another switch inside the step track controller 167 runs synchronously to assign corresponding integrator circuits to the three drives.

If the major axis of the rain drop is parallel to the main plane of the orthogonal coupler 115, then the polarization rotator assembly position is optimum and drive 183 remains stationary relative to the condition before the rain started. However, drive 192 will adjust the phase in the differential phase shifter until the differential phase shift introduced in assembly 133 becomes equal in magnitude and opposite in sign to the differential phase value introduced by the raindrop where the differential phase value introduced by the rain is defined as the phase between electric field vector parallel to the minor axis of the raindrop and the phase of the component orthogonal to this direction. If the inclination of the raindrop changes, then drive 183 becomes also active and operates in a time sequential manner (via clock 169) with drive 191 until the error signal at the output of the tracking receiver is diminished. The differential phase shift caused by the rain in the transmitter frequency band is reduced on the basis of ganging the rain control assembly 133 phase shifter to the rain control assembly 131 phase shifter by a mechanical or electrical linkage 193. This linkage can be set to produce $$\frac{\Delta\psi_{R2}}{\Delta\psi_{T2}} = q$$

where $\Delta\psi_{R2}$ equals the differential phase shift in assembly 133 and $\Delta\psi_{T2}$ equals the differential phase shift in assembly 131. The ratio $q$ can be established on the basis of experimental data. It has been determined that $q$ practically equals unity for the 6 GHz uplink, 4 GHz downlink satellite communication system applications.

It may be noticed that the described system works whether all three depolarization effects (Faraday rotation, satellite rotation, rain-caused rotation) are present simultaneously or only partially. Thus, it can be used for all the above purposes. However, the system described in FIG. 6 employs more complicated circuitry and has more loss in the microwave circuit than the system in FIG. 2. The loss effect may be negligible in the transmit chain, but must be taken into account in the receive chain when low noise temperature is desirable.

The described system in FIG. 6 during rain not only follows the polarization rotation, but also reduces the axial ratio caused by rain. However, when the correction for differential attenuation is not included, the achievable axial ratio generally cannot be infinite (cannot be purely linear polarization). Differential attenuators ($\Delta\alpha_T$ and $\Delta\alpha_R$) may be included in the rain control assembly 131 and 133. They operate from drive 191 and the synchronous switch divides the use of the step track controller among drive 183, drive 192 and the drive 191 for the differential attenuators. The differential attenuation in the rain control assemblies 131 and 133 can be provided with the rain control assemblies like that described in connection with assembly 21 by having an adjustable attenuating means in the two flexible waveguides between the hybrids. This attenuating means in each assembly could be two slabs of lossy material with slab introduced in the top wall of each of the flexible waveguides. The drive 191 would cause one of the slabs in each assembly (assembly 131 via linkage 193a) to introduce more of the lossy material in one waveguide while causing a corresponding decrease in the amount of lossy material in the other waveguide.

What is claimed is:

1. In an antenna system of the type including means for providing maximum coupling of radio frequency waves of a given polarization, the improvement therewith for automatically correcting for changes in the rotation of the polarization of waves when travelling through the ionosphere to maintain polarization alignment comprising:

means for locally generating a continuous control signal which represents the nominal amount of Faraday rotation that then exists for a radio frequency wave at a given frequency in the region of the antenna site, and means responsive to said control signal for adjusting the polarization angle of the coupling means in accordance with said control signal to maintain alignment.

2. The combination as claimed in claim 1 wherein said means for locally generating a control signal includes a clock and a signal generating means responsive to timing signals from said clock.

3. The combination of claim 1 wherein said means for locally generating a control signal includes means for generating a sinusoidal signal with a period for approximately one day, amplitude modulated with a sinusoidal signal with a period of about one year with the maximum daily amplitude just prior to sunset and maximum yearly amplitude in January.

4. In a spectrum reuse antenna system of the type including a single radiating element, an orthogonal coupler coupled at one terminal to said radiating element, first and second transmitter terminals adapted to be coupled to first and second sources of transmitting waves of a first frequency band, first and second receiver terminals adapted to be coupled to first and second receivers which are adapted to receive waves at a second frequency band, first coupling means coupled between second and third terminals of said coupler and said first and second transmitter terminals for generating at said coupler transmitting waves with said transmitting waves from said first source being orthogonal to said transmitting waves from said second source, second coupling means coupled between said second and third terminals of said coupler and said receiver terminals for coupling orthogonally polarized received waves to said first and second receiver terminals, the improvement therewith for automatically correcting for Faraday rotation comprising:

means for locally generating a first continuous control signal which represents the nominal amount of Faraday rotation of the polarization of a wave that then exists at one of said first and second frequency bands at the region of the antenna site, means for rotating said radiating element with respect to said orthogonal coupler, said rotating means being responsive to said first control signal for rotating said orthogonal coupler with respect to said radiating element in a manner to correct for polarization rotation of the waves at said one frequency band, means for locally generating a second continuous control signal which represents the nominal amount of Faraday rotation of the polarization of a wave at the other of said first and second frequency bands that then exists plus the depolarization caused by rotating the orthogonal coupler to correct for polarization rotation of said one frequency band, and means including an adjustable power divider in one of said first and second coupling means responsive to said second control signal for rotating the polarization of said waves at said other frequency band independently of the angle of polarization of said waves at said one frequency band to correct for the Faraday polarization rotation at said other frequency band.

5. In a spectrum reuse ground station antenna system of the type used to communicate with a satellite including a single radiating element, an orthogonal coupler coupled at one terminal to said radiating element, first and second transmitter terminals adapted to be coupled to first and second sources of transmitting waves of a first frequency band, first and second receiver terminals adapted to be coupled to first and second receivers which are adapted to receive waves at a second frequency band, means including an adjustable power divider coupled between second and third terminals of said coupler and said first and second transmitter terminals for generating at said coupler transmitting waves with said transmitting waves from said first source being orthogonal to said transmitting waves from said second source, and means coupled between said second and third terminals of said coupler and said receiver terminals for coupling orthogonally polarized receive waves to said first and second receiver terminals where the orthogonal polarizations of the first and second bands are aligned at the satellite antenna, the improvement therewith for automatically correcting for Faraday rotation comprising:

means for locally generating a first continuous control signal which represents the nominal amount of Faraday rotation of the polarization of a received wave that then exists at said second frequency band at the region of the antenna site, means for rotating said radiating element with respect to said orthogonal coupler, said rotating means being responsive to said first control signal for rotating said orthogonal coupler element with respect to said radiating element in a manner to correct for polarization rotation of the received waves, means for locally generating a second continuous control signal which represents the nominal amount of Faraday rotation of the polarization of a transmitted wave that then exists plus the depolarization caused by rotating the orthogonal coupler to correct for polarization rotation of the received wave, and means coupled to said adjustable power divider and responsive to said second control signal for rotating the polarization of said transmitting waves independently of the angle of polarization of said receiving waves to correct for the polarization rotation of said transmitted waves through the ionosphere.

6. The combination claimed in claim 5 including means coupled to one of said receiver terminals for detecting cross-polarized signals, means coupled to said means for rotating said orthogonal coupler with respect to said radiating means and responsive to said received cross-polarized signal for rotating said orthogonal coupler with respect to said radiating means to minimize said cross-polarization.

7. In a spectrum reuse antenna system of the type including means for transmitting orthogonally polarized radio frequency waves at one frequency band to a satellite and means for receiving orthogonally polarized radio frequency waves from said satellite at a second frequency band through a common antenna, the improvement therewith for automatically correcting for changes in the rotation of the polarization of the transmitting waves and the receiving waves when travelling through the ionsphere to maintain polarization alignment comprising:
  means for locally generating a first continuous control signal which represents the nominal amount of Faraday rotation of the polarization of a received wave that then exists at said second frequency band travelling through the ionosphere in the region of the antenna site, and for locally generating a second continuous control signal which represents the nominal amount of Faraday rotation of the polarization of a transmitting wave that then exists at said one frequency band travelling through the ionosphere in the region of the antenna site,
  means responsive to said first control signal for independently rotating the polarization angle for said receiving means and responsive to said second control for rotating the polarization of said transmitting waves in accordance with said second control signal.

8. In a spectrum reuse antenna system for use with a spectrum reuse satellite of the type including a single radiating element, the orthogonal coupler coupled at one terminal to said radiating element, first and second transmitter terminals adapted to be coupled to first and second sources of transmitting waves, first and second receiver terminals adapted to be coupled to first and second receivers, means including a first adjustable power divider coupled between said first and said second transmitter terminals and the second and third terminals of said coupler for generating at said coupler transmitted waves with said transmitted waves from said first source being orthogonal from said transmitted waves from said second source, and means including a second adjustable power divider coupled between said second and third terminals of said coupler and said receiver terminals for coupling orthogonally polarized received waves to said first and second receiver terminals, the improvement therewith for automatically correcting for Faraday, atmospheric, and satellite caused rotation comprising:
  means for locally generating a first continuous control signal which represents the nominal amount of Faraday rotation of the polarization of a received wave that then exists at said receiver frequency band travelling through the ionosphere at the region of the antenna site and a second continuous control signal which represents the nominal amount of Faraday rotation of the polarization of a transmitted wave that then exists travelling through the ionosphere at the transmitter frequency band at the region of the antenna site,
  means for rotating said orthogonal coupler with respect to said radiating element,
  means coupled to said first adjustable power divider and responsive to said second control signal for rotating the polarization of said transmitted waves independently of the polarization angle of susceptance of said received waves to correct for the polarization rotation of said transmitted waves through the ionosphere,
  means coupled to said second adjustable power divider and responsive to said first control signal for independently rotating the polarization angle of susceptance of the receiving portion of the antenna system to correct for the polarization rotation of the received waves through the ionosphere,
  cross-polarized signal detector means coupled to one of said receiver terminals for detecting the level of the cross-polarized signal, drive means coupled to said means for rotating said orthogonal coupler with respect to said radiating element and responsive to said received cross-polarized signal for rotating said orthogonal coupler with respect to said radiating means to minimize cross-polarization.

9. The combination of claim 8 including a first differential phase shifter coupled between said first and said second receiver terminals and said orthogonal coupler, and second drive means coupled to said first differential phase shifter and responsive to the level of said detected cross-polarized signal from said cross-polarized signal detector means for adjusting the relative phase of the two received signals from the orthogonal coupler to reduce said cross-polarized signal.

10. The combination of claim 9 including a second differential phase shifter coupled between said first and second transmitter terminals and said orthogonal coupler and means coupled to said second differential phase shifter and responsive to said second drive means for adjusting the relative phase shift of the two transmit signals coupled to the orthogonal coupler.

11. The combination of claim 10 including first and second differential attenuators with said first differential attenuator coupled between said first and second receiver terminals and said orthogonal coupler and said second differential attenuator coupled between said first and second transmitter terminals and said orthogonal coupler, and third drive means responsive to the level of said detected cross-polarized signal from said cross-polarized signal receiver means for adjusting the relative attenuation between the two transmitted signals coupled to the orthogonal coupler and the two received signals coupled from the orthogonal coupler.

12. An antenna feed system adapted to transmit a pair of orthogonally polarized transmit signals with adjustable polarization attitude comprising:
  orthogonal coupling means having first and second energy induced pick-up means which are orthogonally related,
  a first quadrature hybrid having a pair of input terminals and a pair of output terminals responsive to a first transmit signal applied to the first input terminal for splitting said signal into components that are at phase quadrature at the first and second output terminals and responsive to a second transmit signal applied to the second input terminal for splitting said second signal into components that are at phase quadrature at the first and second output terminals, a second quadrature hybrid having first and second output terminals coupled respectively to the first and second pick-up means, a first flexible waveguide coupled between the first output terminal of said first quadrature hybrid and a first input terminal of said second hybrid, a second flexible waveguide coupled between the second output terminal of said first hybrid and a second input terminal of said second mentioned quadrature hybrid, and means for rotating one of said hybrids relative to the other to thereby cause an increase in the path length through one of said waveguides while correspondingly decreasing the path length of the other waveguide whereby the polarization of said transmit signals are changed while maintaining their orthogonal relationship.

* * * * *